(12) United States Patent
Nukala et al.

(10) Patent No.: US 9,357,506 B2
(45) Date of Patent: *May 31, 2016

(54) TRANSMIT ANTENNA SELECTION IN A MOBILE WIRELESS DEVICE

(71) Applicant: Apple Inc., Cupertino, CA (US)

(72) Inventors: Gaurav R. Nukala, Sunnyvale, CA (US); Venkatasubramanian Ramasamy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,337

(22) Filed: Sep. 8, 2014

(65) Prior Publication Data

US 2015/0065188 A1    Mar. 5, 2015

Related U.S. Application Data

(63) Continuation of application No. 13/406,444, filed on Feb. 27, 2012, now Pat. No. 8,831,532.

(51) Int. Cl.
*H04W 52/24* (2009.01)
*H04W 52/36* (2009.01)
*H04B 17/10* (2015.01)
*H04W 52/26* (2009.01)
*H04W 52/08* (2009.01)
*H04W 52/42* (2009.01)
*H04W 88/02* (2009.01)

(52) U.S. Cl.
CPC ........... *H04W 52/246* (2013.01); *H04B 17/102* (2015.01); *H04W 52/241* (2013.01); *H04W 52/265* (2013.01); *H04W 52/365* (2013.01); *H04W 52/08* (2013.01); *H04W 52/367* (2013.01); *H04W 52/42* (2013.01); *H04W 88/02* (2013.01)

(58) Field of Classification Search
CPC combination set(s) only.
See application file for complete search history.

(56) References Cited

U.S. PATENT DOCUMENTS

| 7,099,380 | B1 * | 8/2006 | Feng et al. | 375/150 |
| 2011/0044376 | A1 * | 2/2011 | Lin et al. | 375/130 |
| 2012/0021702 | A1 * | 1/2012 | Liu et al. | 455/90.2 |
| 2013/0005278 | A1 * | 1/2013 | Black et al. | 455/77 |
| 2013/0035051 | A1 * | 2/2013 | Mujtaba et al. | 455/277.2 |
| 2013/0035103 | A1 * | 2/2013 | Mujtaba et al. | 455/450 |
| 2013/0156080 | A1 * | 6/2013 | Cheng et al. | 375/222 |

* cited by examiner

*Primary Examiner* — Junpeng Chen
(74) *Attorney, Agent, or Firm* — Downey Brand LLP

(57) ABSTRACT

Methods and apparatuses to select a transmit antenna in a mobile wireless device connected to a wireless network are described. The mobile wireless device monitors received signal characteristics through first and second antennas and switches antennas based on the monitored signal characteristics and on an assessment of the sufficiency of available transmit power headroom to accommodate data transmissions in the uplink direction. Sufficiency is determined based on one or more criteria including achievable data rate throughput, quality of service, grade of service, an amount of data buffered, an amount of resources allocated by the wireless network and a number of "power up" commands received by the mobile wireless device during a pre-determined time interval.

19 Claims, 13 Drawing Sheets

TRANSMIT ANTENNA SELECTION IN A MOBILE WIRELESS DEVICE

CROSS REFERENCE TO RELATED APPLICATIONS

This application is a continuation of U.S. application Ser. No. 13/406,444, filed Feb. 27, 2012, entitled, "TRANSMIT ANTENNA SELECTION IN A MOBILE WIRELESS DEVICE", which is herein incorporated by reference in its entirety.

FIELD

The described embodiments generally relate to methods and apparatuses for adaptive transmit antenna selection for mobile wireless devices. More particularly, the present embodiments describe selecting an antenna for uplink transmission at a mobile wireless device based on measured downlink transmission properties and estimated uplink transmission requirements.

BACKGROUND

Wireless networks continue to evolve as new communication technologies develop and standardize. Current wireless network deployments include many variations in architecture, including support for different wireless communication technologies offered by one or more wireless network service providers. A representative wireless network for a wireless network service provider can include support for one or more releases of wireless communication protocols specified by the Third Generation Partnership Project (3GPP) and Third Generation Partnership Project 2 (3GPP2) communication standards organizations. The 3GPP develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 develops wireless communication standards that include CDMA2000 1×RTT and 1×EV-DO standards. Newer wireless communication protocols include options for transmission and reception using multiple antennas, and mobile wireless devices can include several antennas located in different areas of the mobile wireless device to improve transmission and reception performance. While multiple antenna reception in a mobile wireless device can be used in certain wireless communication protocols for downlink transmission, multiple antenna uplink transmission can be precluded for the mobile wireless device. The mobile wireless device, however, can select between multiple antennas for single antenna transmission to provide improved uplink performance.

In a mobile wireless device with multiple antennas, radio frequency transmission and reception impairments, such as a user's hand grip on the mobile wireless device, can cause an imbalance in received downlink signal power levels between the different antennas. This radio frequency impairment can also impact uplink transmissions, resulting in a degradation of the transmitted signals from the mobile wireless device to the wireless network. Switching transmission among the multiple antennas can provide improved performance; however, the selection of which antenna to use can be complicated by the irregular transmission characteristics of data traffic. For a voice connection, transmission of voice packets can be approximately continuous, and thus an uplink transmit power can be monitored to determine which antenna to use. In contrast, for a data connection, transmission of data packets can be irregular, and the uplink transmit power levels can vary significantly during the data connection. Thus, there exists a need for a method to select transmit antennas a mobile wireless device based on a set of monitored receive and transmit radio frequency signal characteristics.

SUMMARY

In one embodiment, a method of selecting a transmit antenna in a mobile wireless device connected to a wireless network is described. The method includes at least the following steps. Initially, the mobile wireless device is connected to the wireless network through a first antenna and a second antenna. The mobile wireless device measures a received signal characteristic of a first signal received through the first antenna and of a second signal received through the second antenna. The mobile wireless device selects the first antenna for transmission to the wireless network when the measured received signal characteristic of the first signal exceeds the measured received signal characteristic of the second signal. The mobile wireless device selects the second antenna for transmission to the wireless network when the measured received signal characteristic of the second signal exceeds the measured received signal characteristic of the first signal by at least a pre-determined signal characteristic threshold level and when available power to transmit through the first antenna is insufficient to support data traffic from the mobile wireless device to the wireless network. Otherwise, the mobile wireless device selects a presently used antenna for transmission to the wireless network.

In an embodiment of the described method, the mobile wireless device determines available power to transmit through the first antenna is insufficient to support data traffic from the mobile wireless device to the wireless network when a transmit power level assigned to an uplink pilot signal exceeds a pre-determined pilot threshold level. In another embodiment of the described method, the mobile wireless device determines available power to transmit through the first antenna is insufficient to support data traffic from the mobile wireless device to the wireless network when a minimum uplink data rate for a grade of service cannot be met. In a further embodiment of the described method, the mobile wireless device determines available power to transmit through the first antenna is insufficient to support data traffic from the mobile wireless device to the wireless network when the mobile wireless device is unable to transmit data through the first antenna at a specified quality level. In another embodiment of the described method, the mobile wireless device monitors a transmit power level of an uplink pilot signal transmitted through the first antenna and determines available power to transmit through the first antenna is insufficient to support data traffic from the mobile wireless device to the wireless network when the monitored transmit power level of the uplink pilot signal exceeds a pre-determined pilot threshold level for a pre-determined time interval and when the mobile wireless device receives repeated commands from the wireless network to increase the uplink pilot signal transmit power level during the pre-determined time interval. In yet a further embodiment of the described method, the mobile wireless device monitors an amount of data in a buffer in the mobile wireless device to be transmitted to the wireless network, calculates a required transmit power level to transmit the amount of data in the buffer and an available transmit power level, and determines available power to transmit through the first antenna is insufficient to support data traffic from the mobile wireless device to the wireless network when a ratio of the required transmit power level divided by the available transmit power level is greater than a pre-determined transmit power ratio threshold.

In a further embodiment, a mobile wireless device connected to a wireless network through a first antenna and a second antenna is described. The mobile wireless device includes an application processor, a baseband processor and a transceiver. The application processor is configured to control establishing and releasing connections for application services in the mobile wireless device. The baseband processor is configured to process signals according to one or more wireless communication protocols. The transceiver is configured to transmit signals to and receive signals from the wireless network through the first antenna and the second antenna. The baseband processor is further configured to measure a received signal characteristic of a first signal received through the first antenna and of a second signal received through the second antenna. The baseband processor is also configured to select the first antenna for transmission to the wireless network when the measured received signal characteristic of the first signal exceeds the measured received signal characteristic of the second signal. The baseband processor is additionally configured to select the second antenna for transmission to the wireless network when the measured received signal characteristic of the second signal exceeds the measured received signal characteristic of the first signal by at least a pre-determined signal characteristic threshold level and when available power to transmit through the first antenna is insufficient to support data traffic from the mobile wireless device to the wireless network. The baseband processor is finally configured to select a presently used antenna for transmission to the wireless network otherwise.

In yet another embodiment, a computer program product encoded in a non-transitory computer readable medium for selecting a transmit antenna in a mobile wireless device connected to a wireless network through a first antenna and a second antenna is described. The computer program product includes at least the following computer program code. Computer program code for measuring a received signal characteristic of a first signal received through the first antenna and of a second signal received through the second antenna. Computer program code for selecting the first antenna for transmission to the wireless network when the measured received signal characteristic of the first signal exceeds the measured received signal characteristic of the second signal. Computer program code for selecting the second antenna for transmission to the wireless network when the measured received signal characteristic of the second signal exceeds the measured received signal characteristic of the first signal by at least a pre-determined signal characteristic threshold level and when available power to transmit through the first antenna is insufficient to support data traffic from the mobile wireless device to the wireless network. Computer program code for otherwise selecting a presently used antenna for transmission to the wireless network.

BRIEF DESCRIPTION OF THE DRAWINGS

The described embodiments and the advantages thereof may best be understood by reference to the following description taken in conjunction with the accompanying drawings.

DETAILED DESCRIPTION

Figure 1:
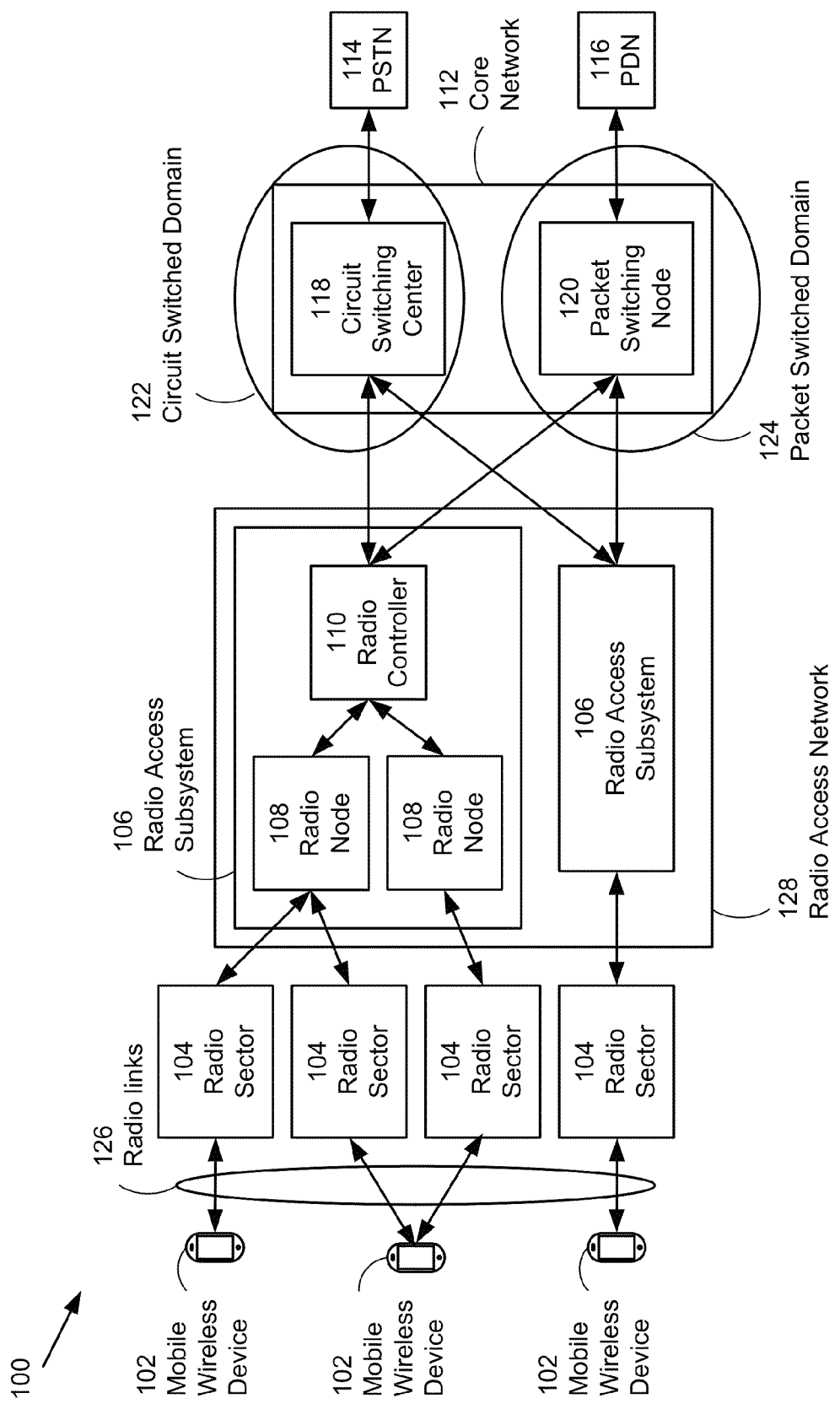
FIG. 1 illustrates components of a generic wireless network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for adaptive transmit antenna selection for mobile wireless devices when connected to a wireless network. In particular, the mobile wireless device can be configured to selecting an antenna for uplink transmission at a mobile wireless device based on measured downlink transmission properties and estimated uplink transmission requirements. The mobile wireless device can include multiple antennas located in different areas of the mobile wireless device to improve transmission and reception performance. The mobile wireless device can select between multiple antennas for single antenna transmission to provide improved uplink performance.

In a mobile wireless device with multiple antennas, radio frequency transmission and reception impairments, such as a user's hand grip on the mobile wireless device or a mounting bracket in which the mobile wireless device can be placed or a case in which the mobile wireless device can be enclosed, can cause an imbalance in received downlink signal power levels between the different antennas. This radio frequency impairment can also impact uplink transmissions, resulting in a degradation of the transmitted signals from the mobile wireless device to the wireless network. Current wireless communication protocols can limit mobile wireless devices to use only one antenna when transmitting signals in the uplink direction to the wireless network, while allowing the mobile wireless device to use multiple antennas when receiving signals in the downlink direction from the wireless network. Switching transmission among the multiple antennas can provide improved performance; however, the selection of which antenna to use can be complicated by the irregular transmission characteristics of data traffic. For a voice connection, transmission of voice packets can be approximately continuous, and thus an uplink transmit power can be monitored to determine which antenna to use. The uplink transmissions can be monitored for a pre-determined number of frames (or equivalently time interval) to decide whether to switch from an antenna in use to a different antenna for transmission to the wireless network. In contrast, for a data connection, transmission of data packets can be irregular, and the uplink transmit power levels can vary significantly during the data connection. Over a pre-determined number of transmit frames (or a pre-determined time interval), the transmit power level can vary significantly depending on the amount of data traffic that occurs during a monitored time interval. As described herein, the mobile wireless device can select an antenna for uplink transmission by monitoring received downlink transmit signal characteristics and detecting a signal characteristic imbalance condition between the multiple antennas in the mobile wireless device. Criteria can be selected to determine when to switch antennas based on whether a desired data transmission characteristic (e.g. rate, quality of service, grade of service) can be achieved using an estimated available amount of transmit power for uplink transmissions. Thresholds for switching between antennas can be selected to ensure that transitioning between different antennas in use is smooth and avoids excessive switching occurrences.

It should be understood that implementations of the same methods and apparatuses described herein can apply to mobile wireless devices used in different types of wireless networks. For example, the same teachings can be applied to a UMTS network, an LTE (LTE-advanced) network, a CDMA2000 1× (EV-DO) network. In general, the teachings described herein can apply to a mobile wireless device having multiple antennas operating in a wireless network in which reception by the mobile wireless device can use multiple antennas, while transmission by the mobile wireless device can use single antennas. The specific examples and implementations described herein are presented for simplicity in relation to UMTS, CDMA2000 1×RTT and 1×Ev-DO networks but can also apply to other wireless network environments.

By switching antennas for data applications, the mobile wireless device can ensure an improved user experience by providing more transmit power headroom for data transmissions, which can result in higher throughput rates in both the uplink and downlink directions. Real-time data applications such as a video chat over a 3G/4G wireless connection can be affected by the nominal throughput rate and variability during a data connection. The throughput rate for a "best effort" data application can also be improved by selecting a better antenna for uplink transmission. In addition, downlink data throughput performance can be affected by uplink data transmission by improving the reliability of ACK/NACK signaling in the uplink direction. Selecting a superior antenna for uplink performance can thus indirectly result in improved performance in the downlink direction. Data connection retention can also be improved by improving uplink performance, thereby avoiding a user having to initiate a new data connection when uplink performance using a current transmit antenna is limited. Selecting a higher performance antenna can also result in a mobile wireless device using less transmit power in the uplink direction, as a mobile device can be commanded to increase its transmit power when the transmit signal is blocked or occluded. Lower transmit levels from the mobile wireless device can reduce the overall level of interference between mobile wireless devices in the wireless network. Finally, handovers from higher data rate communication protocols to lower data rate communication protocols, such as from 1×EV-DO to 1×RTT or from LTE to UMTS can be reduced by increasing the throughput, performance and reliability of uplink transmissions using the higher data rate communication protocols.

These and other embodiments are discussed below with reference to FIGS. 1-13. However, those skilled in the art will readily appreciate that the detailed description given herein with respect to these figures is for explanatory purposes only and should not be construed as limiting.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Radio sectors 104 can have different geometric shapes depending on a transmission antenna configuration, such as an approximate circle or hexagon radiating outward from an omni-directional antenna at a centrally placed radio node 108 or a cone shape or a rhomboid shape radiating from a directional antenna at a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126. To form a mobile terminated connection between the mobile wireless device 102 and the radio access network 128, a radio controller 110 in the radio access subsystem 106 can instruct the radio node 108 to transmit a signaling message, such as a page message, to the mobile wireless device 102. In certain networks, the radio controller 110 can also instruct the radio node 108 to transmit a signaling indicator, such as a page indicator bit, in advance of the page message to provide notice to the mobile wireless device 102 of the forthcoming page message. Upon reception of the page message, the mobile wireless device 102 can attempt to establish an active connection with the wireless network 100 by sending a connection request message on a radio frequency channel. (The connection request can be bundled together with other information into a common message and need not be a distinct connection request message alone.).

In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
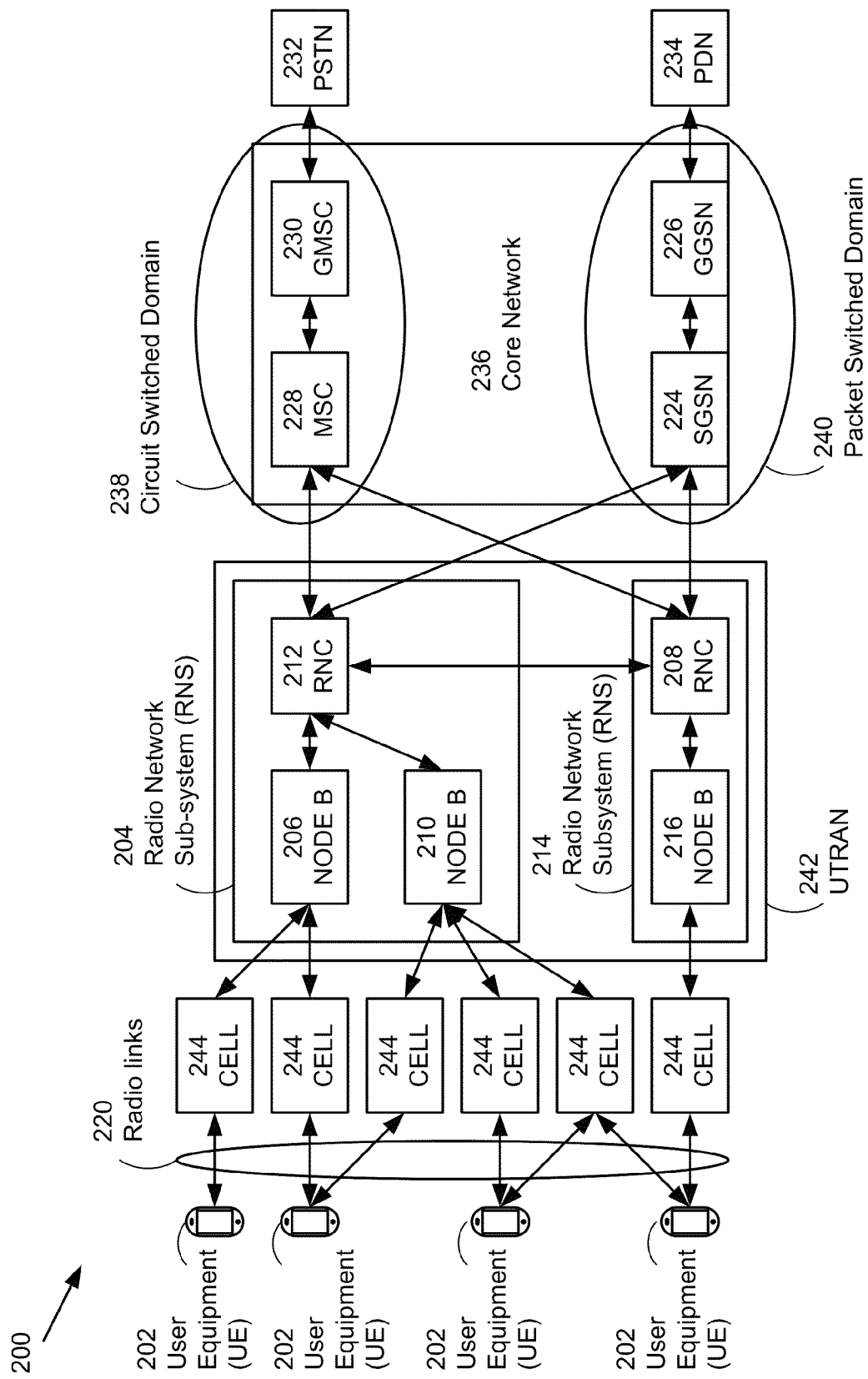
FIG. 2 illustrates components of a UMTS wireless network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network subsystems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. In order to establish a connection, the RNC 208/212 can communicate with the UE 202 through an associated Node-B 206/210/216 using a series of signaling messages. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
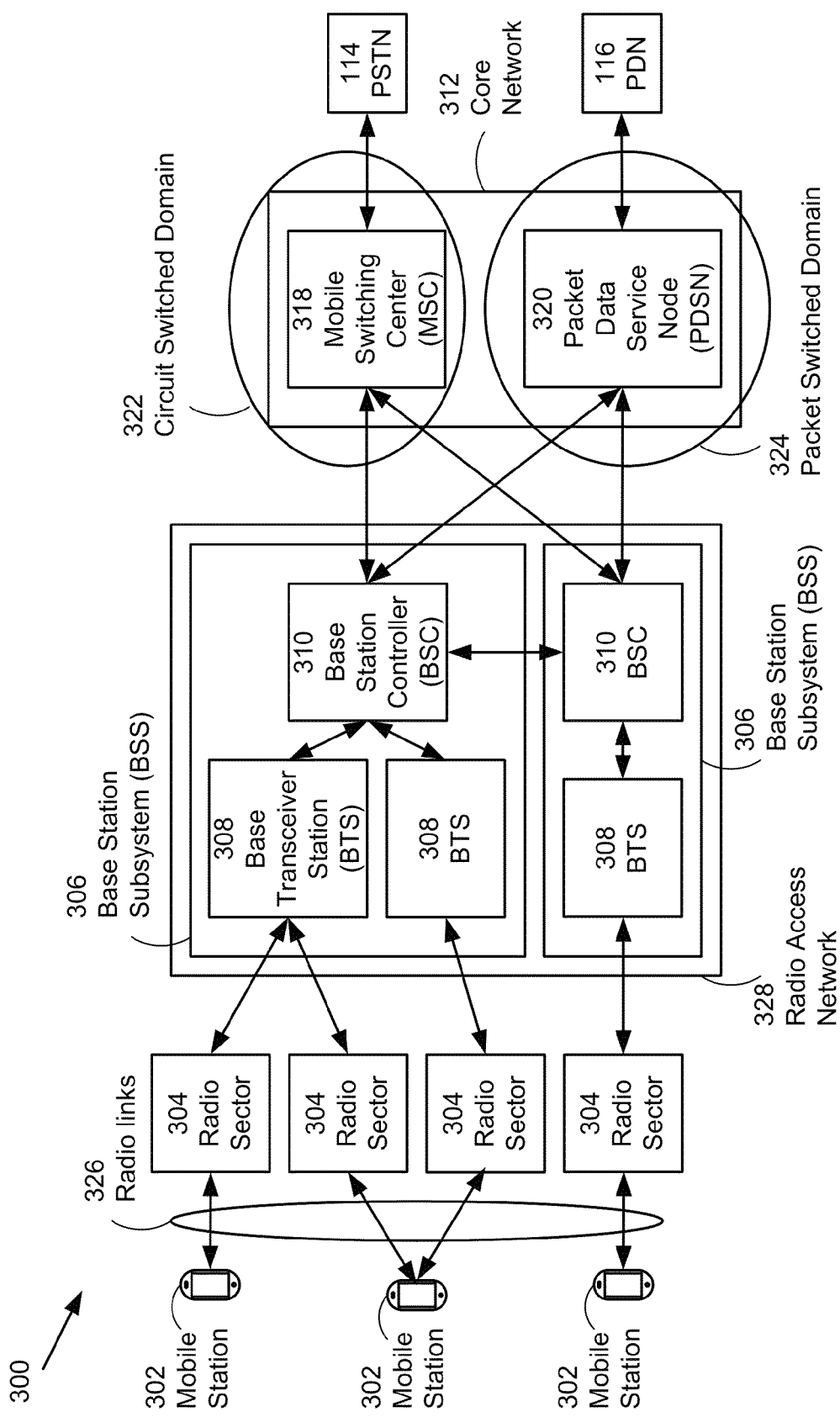
FIG. 3 illustrates components of a CDMA2000 1× (RTT or EV-DO) wireless network.

FIG. 3 illustrates a representative CDMA2000 1× wireless network 300 that can include elements comparable to those described earlier for the generic wireless network 100 and the UMTS wireless network 200. Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
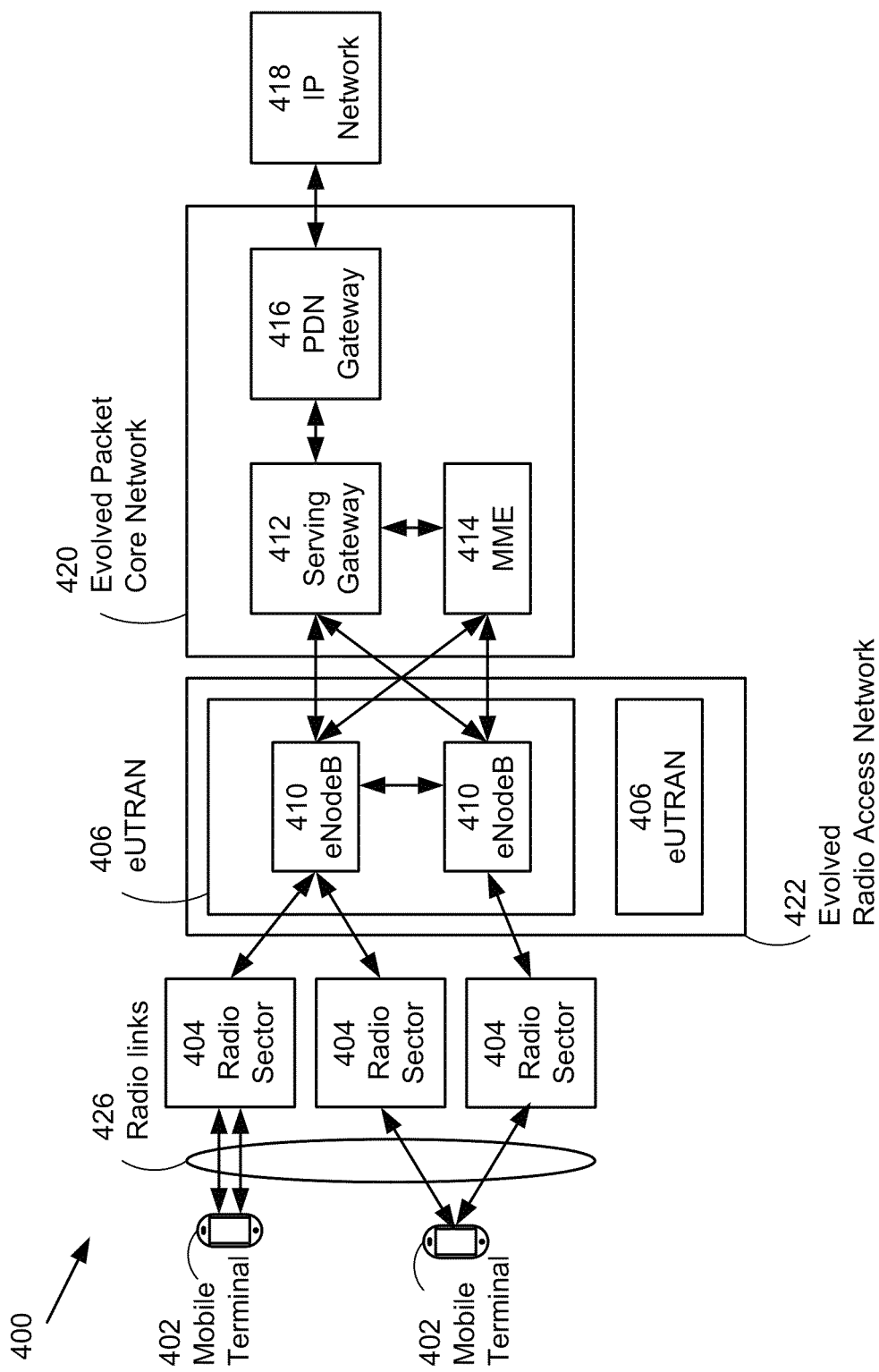
FIG. 4 illustrates components of an LTE (or LTE-Advanced) wireless network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 1× network 300) as well as the base station radio controllers (such as the RNC 212 in the UMTS network 200 and the BSC 310 in the CDMA2000 1× network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

Figure 5:
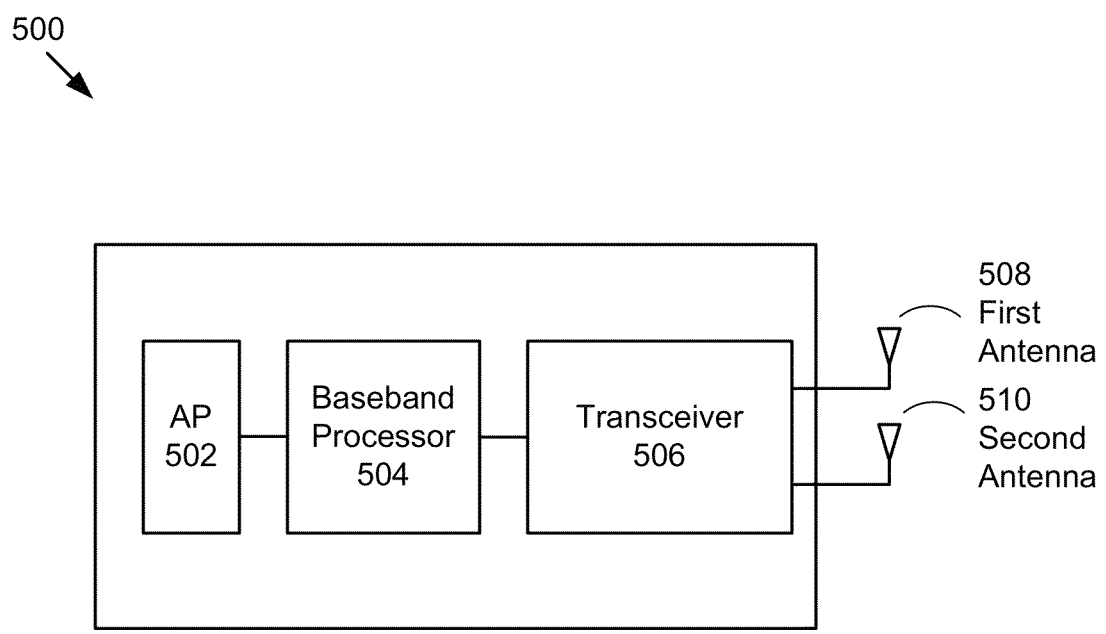
FIG. 5 illustrates select elements of a mobile wireless device.

FIG. 5 illustrates select elements for an architecture 500 that can be used in a mobile wireless device 102. A mobile wireless device 102 can include a baseband processor 504 that can process signals according to one or more wireless communication protocols. The baseband processor 504 can be connected to a transceiver 506 that can transmit and receive radio frequency signals through a first antenna 508 and a second antenna 508. The baseband processor 504 can also be connected to an application processor (AP) 502 that can provide higher layer functions, such as requesting establishment and release of connections for various resident application services. The baseband processor 504 can provide the lower layer functions that can support the transport of data for the higher layer services ordered by the application processor 502. The use of multiple antennas for certain wireless communication protocols can provide improved performance (e.g. higher data rates or better immunity to interference) compared to a single antenna configuration. In a representative embodiment, the AP 502 can establish and release connections and can send and receive messages, while the baseband processor 504 can divide the messages into packets and bits for transport through physical radio frequency channels to the wireless network 100. Received signal characteristics, such as received signal strength indication (RSSI), received signal code power (RSCP), received signal to interference and noise ratios (SINR) can be monitored, calculated and/or estimated by the baseband processor 504 in the mobile wireless device 102. Signals received through the first antenna 508 and through the second antenna 510 can be monitored in parallel by the baseband processor 504. When an imbalance in a measured received signal characteristic is detected by the mobile wireless device 102, which can be detected by the baseband processor 504, the mobile wireless device 102 can select an antenna for transmission based on the level of receive signal imbalance and also based additionally on levels of transmit signal characteristics, such as available transmit power headroom on which to transport data in the uplink direction. While FIG. 5 illustrates a division of processing between an application processor 502, a baseband processor 504 and a transceiver 506, the functions performed by these elements can be divided differently among one or more integrated circuits, and the architecture shown in FIG. 5 is one of many possible embodiments. An alternative architecture for the mobile wireless device 102 can include a combined AP 502 and baseband processor 504 (or portion thereof). Another alternative architecture for the mobile wireless device 102 can include a combined baseband processor 504 and transceiver 506 (or portion thereof).

Figure 6:
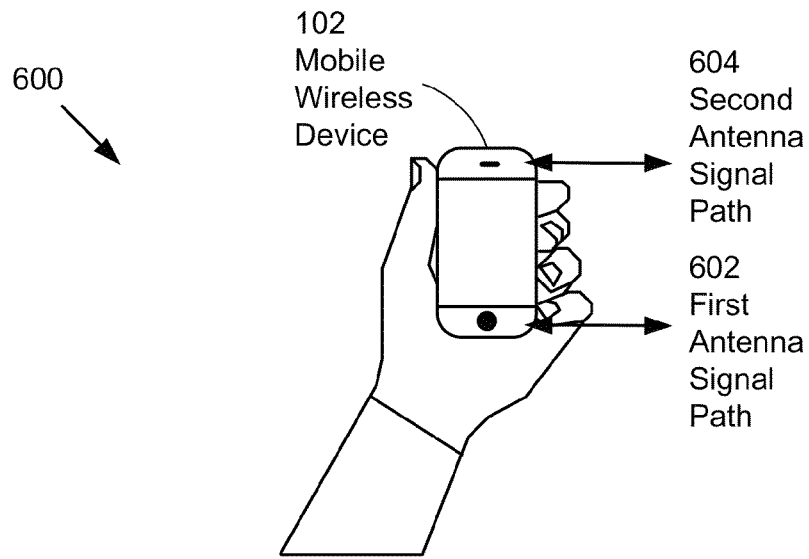
FIG. 6 illustrates different signal paths for a multiple antenna mobile wireless device.
Figure 6:
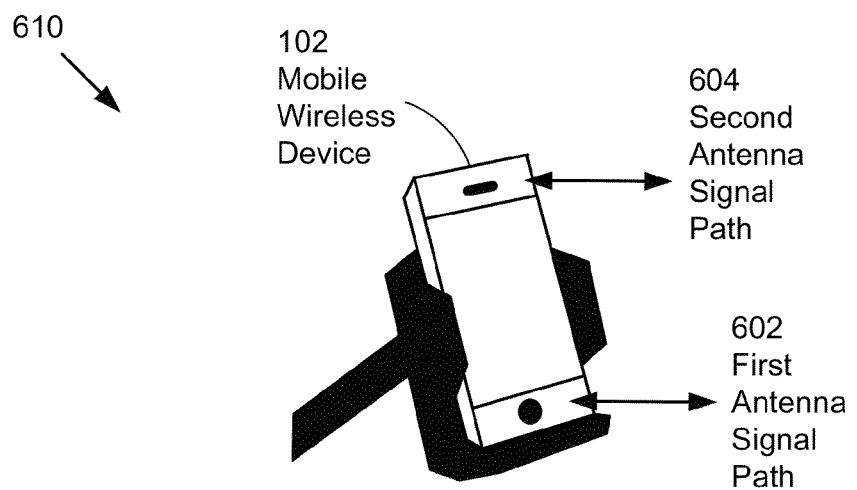

FIG. 6 illustrates two scenarios 600/610 in which transmit and receive radio frequency signals for a mobile wireless device 102 can be affected by a surrounding environment. In the first scenario 600, the mobile wireless device 102 can include a first antenna 508 (not shown) located in one section of the mobile wireless device 102 and a second antenna 510 (also not shown) located in a different section of the mobile wireless device. The two antennas 508/510 can be located at opposite ends of the mobile wireless device 102, and when a user holds the mobile wireless device 102, radio frequency signals transmitted to and received by the first antenna 508 can be at least partially occluded by the user's hand grid/body. A first antenna signal path 602 between the first antenna 508 and the wireless network 100 can be impeded by the hand of the user of the mobile wireless device 102. A second antenna path 604 between the second antenna 510 and the wireless network 100 can be less occluded by the hand grip of the user of the mobile wireless device 102, when the mobile wireless device is held as shown in FIG. 6. While the mobile wireless device can have a preferred positional orientation for a voice connection, such as a speaker at a top portion and a microphone at a bottom portion, a data connection can be used independent of the positional orientation (vertical, horizontal, 180 degree vertical, etc.) as data display on the screen can automatically reposition for the currently used position. Thus in some instances, the second antenna 510 can be more occluded than the first antenna 508. In the second scenario 610, the mobile wireless device 102 is shown mounted in a representative dock that can also block radio frequency signals from a portion of the mobile wireless device 102. As described above, the transmit and receive signal paths for each antenna 602/604 can differ substantially. The mobile wireless device 102 can preferentially determine which antenna provides a better transmit and reception path for radio frequency signals between the mobile wireless device 102 and the wireless network 100 and select use of the better antenna(s).

Figure 7:
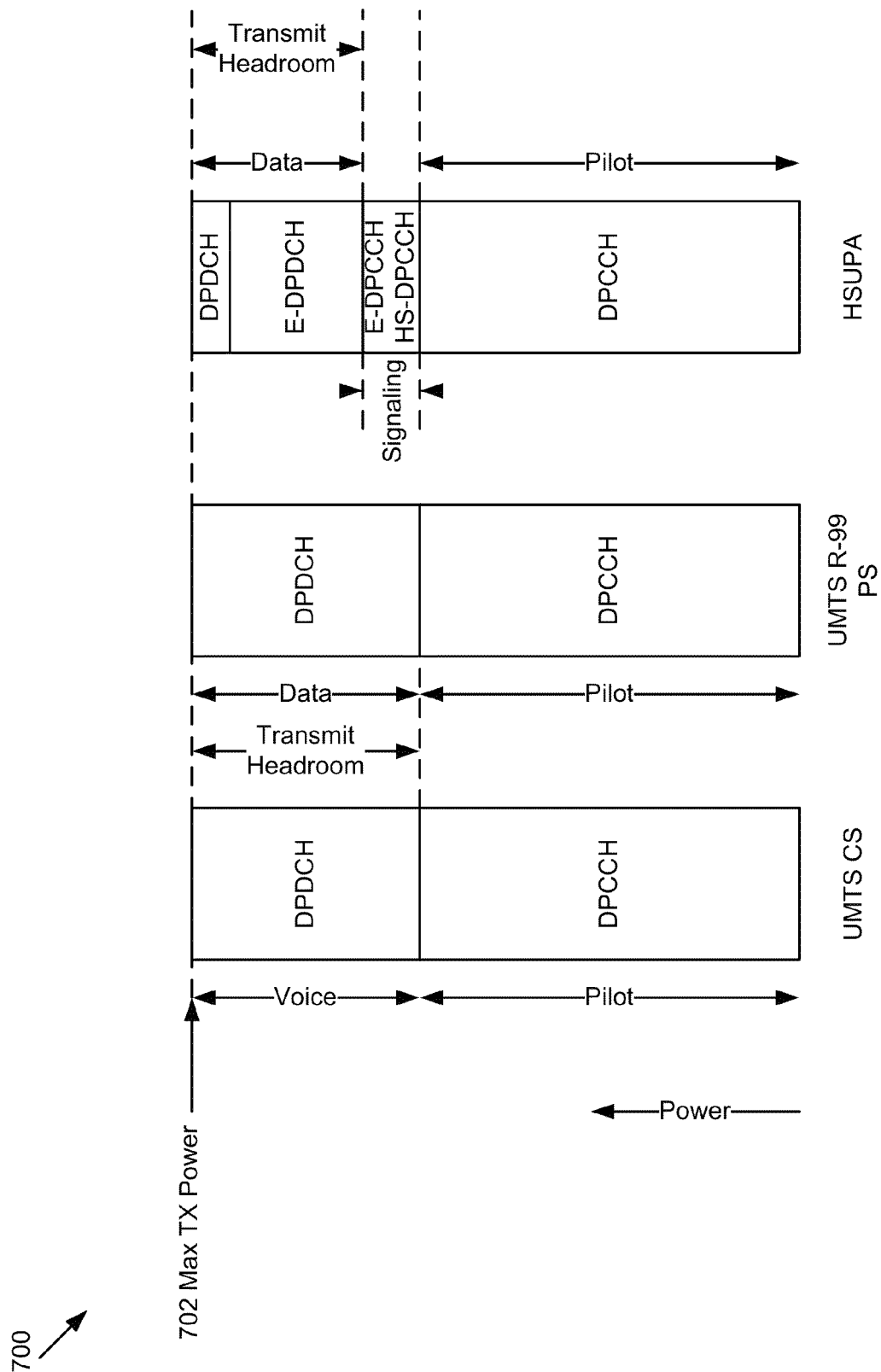
FIG. 7 illustrates a transmit power signal stack for a mobile wireless device operating in a UMTS wireless network.

FIG. 7 illustrates a transmit power stack diagram 700 for a UMTS mobile wireless device 102. The total transmit power from the mobile wireless device 102 to the wireless network 100 can be limited to a maximum transmit power level 702 that can depend on the wireless communication protocol used. A typical maximum transmit power level can be 24 dBm. The transmit power available to the mobile wireless device 102 can be divided among several different types of traffic. A major portion of the transmit power can be used by a pilot signal transported on the dedicated physical control channel (DPCCH) on which signaling messages can be transmitted to the wireless network 100 by the mobile wireless device 102. A voice connection for the UMTS mobile wireless device 102 can use a dedicated physical data channel (DPDCH) to transport circuit switched (CS) voice. Similarly a data connection on a Release 99 (R-99) radio access bearer can use the DPDCH to transport packet switched (PS) data. With the introduction of high speed uplink packet access (HSUPA), a portion of the available uplink transmit power can be allocated to signaling on additional control channels, including an enhanced dedicated physical control channel (E-DPCCH) to transmit control signaling for an enhanced dedicated channel (E-DCH) and a high-speed dedicated physical control channel (HS-DPCCH) to carry acknowledgement and channel quality indicators (CQI) from the mobile wireless device 102 to the wireless network 100. Uplink data can be transmitted on the DPDCH and on an enhanced dedicated physical data channel (E-DPDCH). Enhancements in the HSUPA protocol can provide for higher data transmission rates even though the available transmit headroom can be less than for earlier generation wireless communication protocols.

An available amount of transmit power for voice or data transmission that is not dedicated to control channels can be referred to as a "transmit headroom." The amount of transmit power allocated to pilot/signaling control channels can vary based on attenuation and noise/interference encountered by signals transmitted from the mobile wireless device 102 to the wireless network. The maximum amount of transmit power 702 available to the mobile wireless device 102 can be set by the wireless communication protocol in use. The amount of transmit headroom can thus vary as signal attenuation and noise/interference conditions change throughout the radio sector in which the mobile wireless device 102 is located. While voice connections can require a minimal amount of the available transmit headroom, data connections, particularly those with a guaranteed level of service, can require significantly more transmit headroom. In some situations, the amount of transmit headroom available can be insufficient for the mobile wireless device 102 to accommodate uplink data transmission. If the mobile wireless device 102 includes multiple antennas that can be used for uplink transmission, switching from one antenna to another antenna can provide improved uplink performance when certain conditions are met as described further herein.

Figure 8:
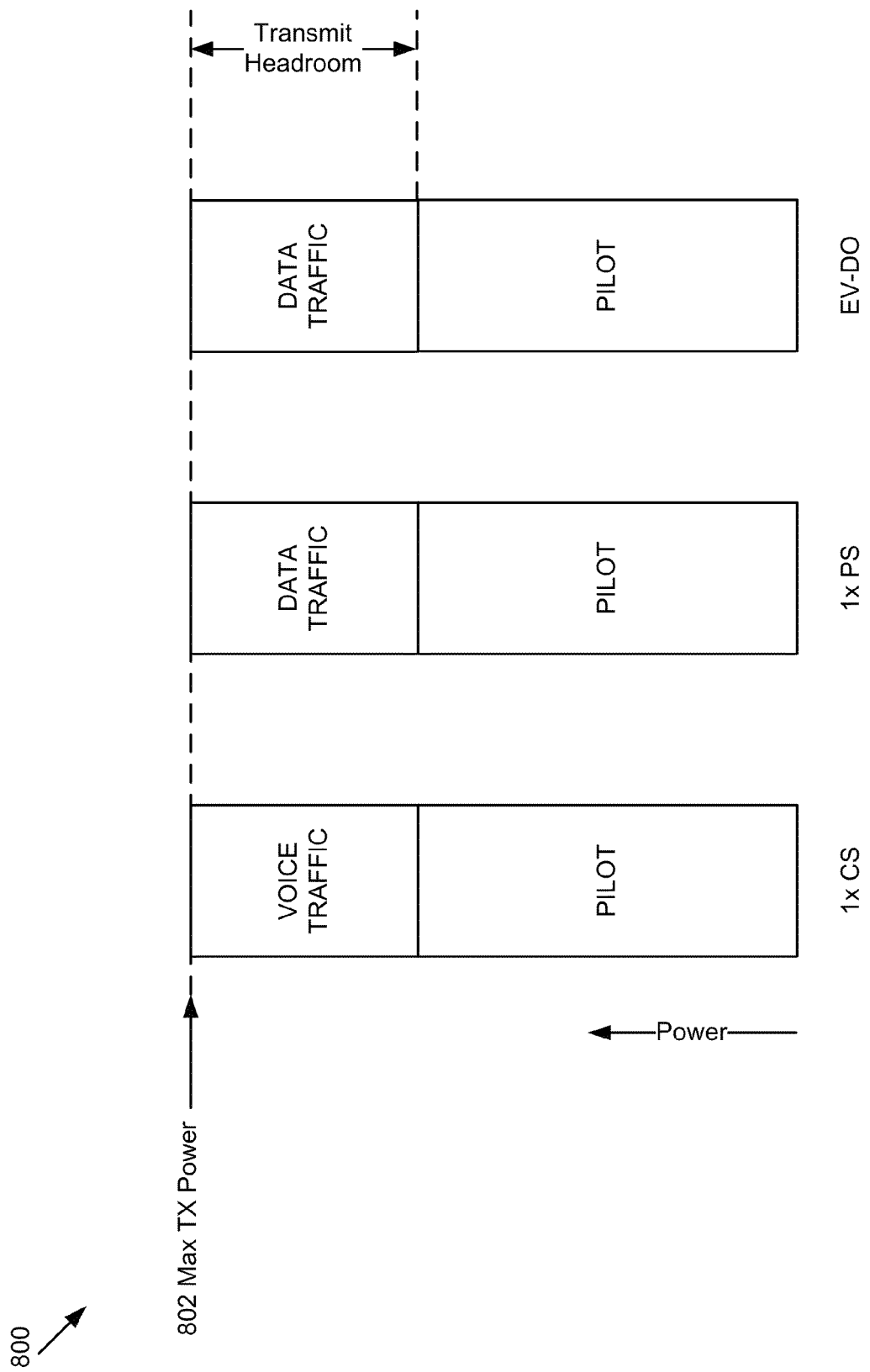
FIG. 8 illustrates a transmit power signal stack for a mobile wireless device operating in CDMA2000 1× and EV-DO wireless networks.

FIG. 8 illustrates a transmit power stack diagram 800 for a CDMA2000 mobile wireless device 102. A maximum amount of total available transmit power 802 can be capped by the wireless network 100 for the mobile wireless device 102. For circuit switched (CS), packet switched (PS) data connections on a CDMA2000 1× wireless network or for a data connection on a CDMA2000 evolution data optimized (EV-DO) wireless network, a portion of the available transmit power can be dedicated to a pilot for signaling while the remaining available transmit power (transit power headroom) can be available for voice or data traffic. As with a UMTS wireless network, the amount of transmit headroom can be insufficient to support data traffic through a currently used transmit antenna, and the mobile wireless device 102 can switch between transmit antennas when certain conditions are met in order to improve uplink transmission performance.

Figure 9:
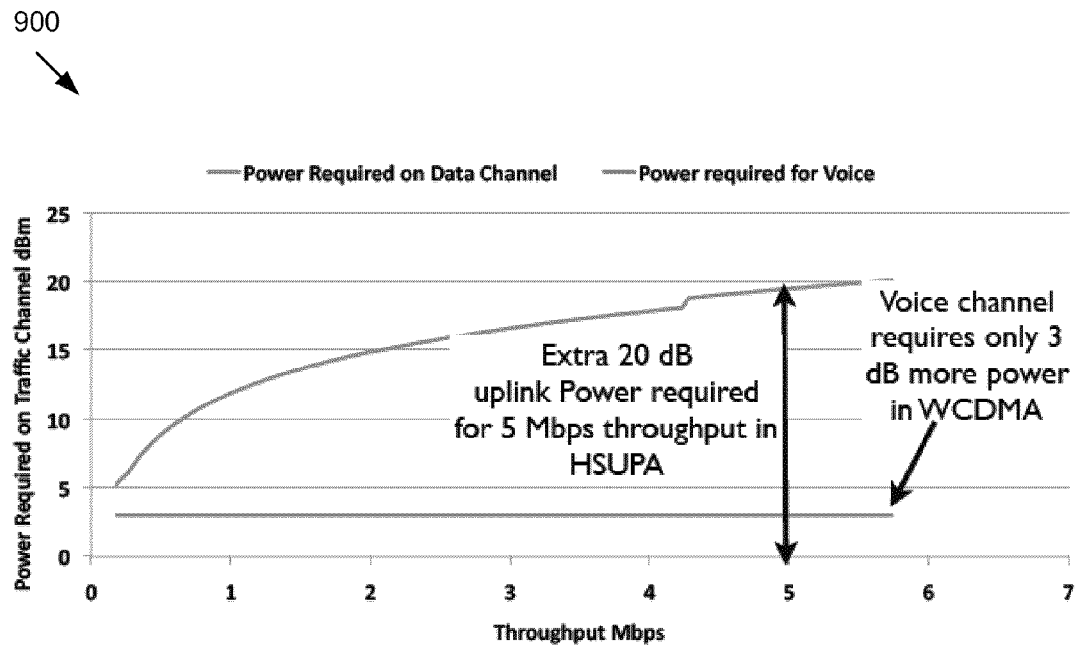
FIG. 9 illustrates transmit power levels required for various data rate throughputs for UMTS and CDMA EV-DO networks.
Figure 9:
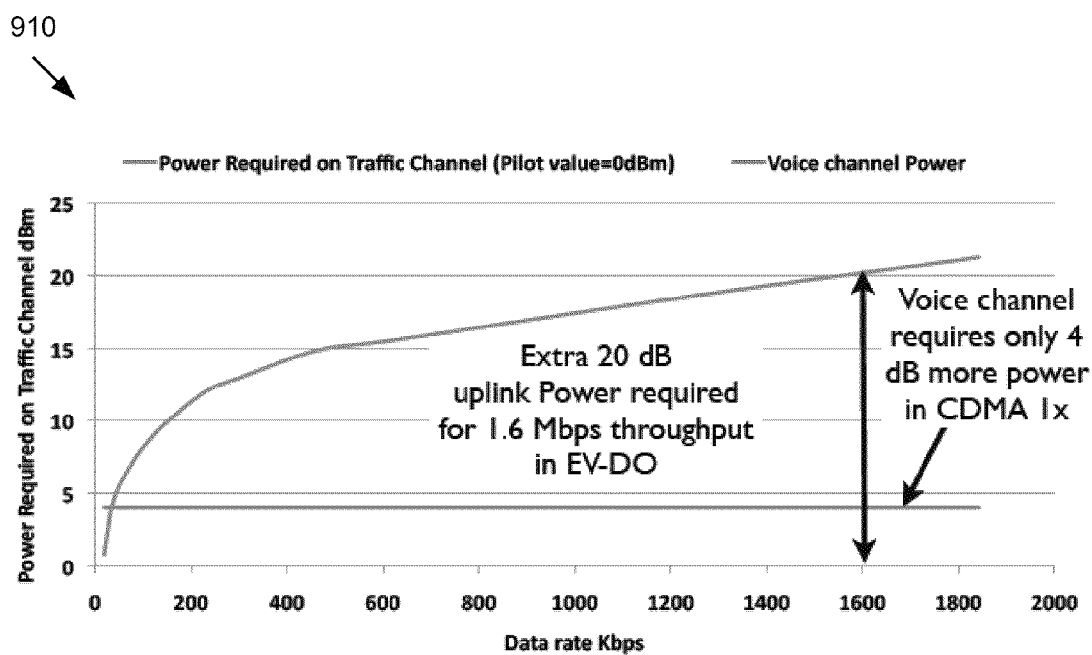

FIG. 9 illustrates an amount of transmit power required on a traffic channel for a voice connection or a data connection on a UMTS wireless network (graph 900) and on a CDMA2000 wireless network (graph 910). A voice connection on a UMTS wireless network can require 3 dB of transmit power headroom, while a HSUPA data connection can require transmit power headroom that ranges from approximately 12 dB at 1 Mbps data throughput to 20 dB of transmit power headroom at 5 Mbps data throughput. Similarly a voice connection on a CDMA2000 1× wireless network can require 4 dB of transmit power headroom, while an EV-DO data connection can require transmit power headroom that ranges from approximately 12 dB at 200 kbps data throughput to 20 dB at 1600 kbps data throughput. The total amount of transmit power available to the mobile wireless device 102 can be capped by the wireless network to comply with a wireless communication protocol used by the mobile wireless device 102 (e.g. a maximum of 24 dBm). The amount of transmit power required for a voice connection can depend on the type of voice codec used for the voice connection; the amount of variation in data rate required for a voice connection, however, can be much less than for a data connection. As described above, the amount of transmit power dedicated to signaling can vary, and the amount of transmit power headroom available for a voice or data connection can also vary. The amount of transmit power required by a user of the mobile wireless device 102 can vary instantaneously depending on user activity. The amount of transmit power available for a data connection can be limited in some cases, and a throughput data rate required by the user cannot be guaranteed when there is insufficient transmit power headroom. Switching transmit antennas can provide additional transmit power headroom for data transmission when an alternative antenna provides an improved signal path to the wireless network 100 compared with the current transmit antenna in use. Switching between transmit antennas as required can maximize throughput based on available transmit power headroom.

Figure 10:
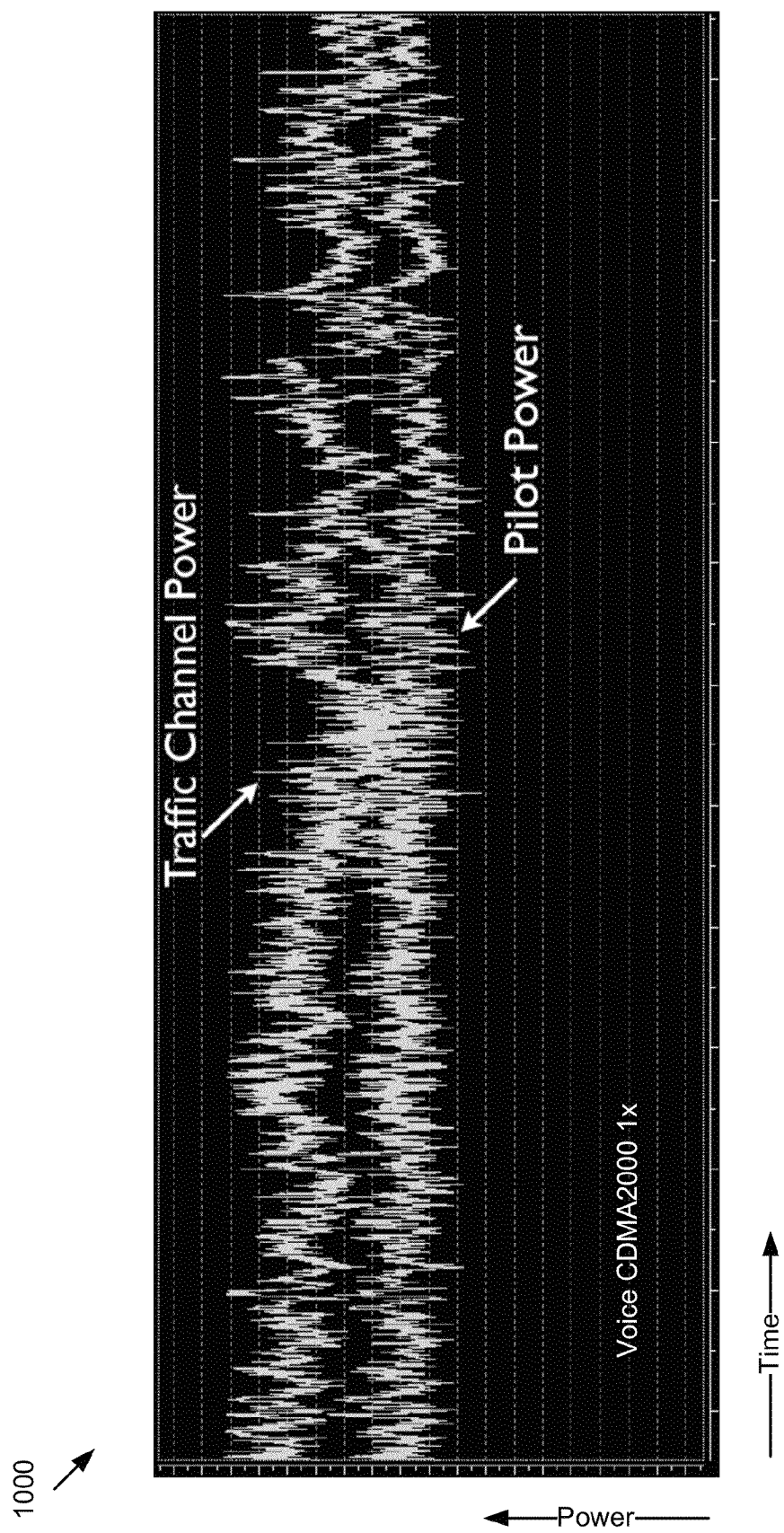
FIG. 10 illustrates measured power levels for a CDMA2000 1× voice connection.

FIG. 10 illustrates a time-domain capture of uplink transmit power during a voice connection between a mobile wireless device 102 and a CDMA2000 1× wireless network 100. The transmit power dedicated to the pilot signaling channels and the total amount of transmit power for all traffic, including both the voice connection and the pilot signaling, track closely to one another. A voice connection can have relatively continuous transmit power, and thus the total amount of transmit power in use can be tracked to determine when to switch transmit antennas. For a data connection, however, the total amount of transmit power can vary substantially, as data traffic can be bursty and discontinuous in transmission.

Figure 11:
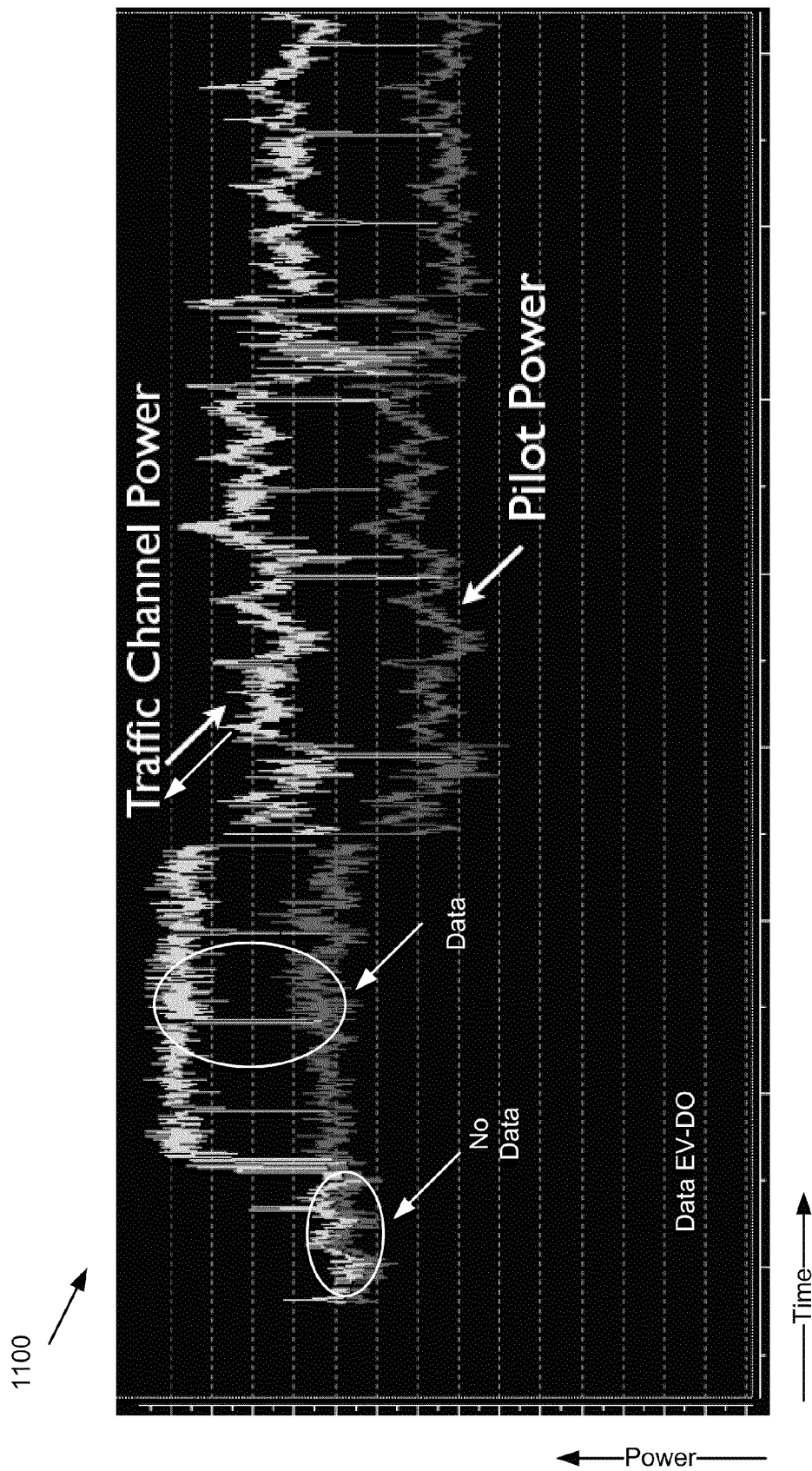
FIG. 11 illustrates measured power levels for a CDMA EV-DO data connection.

FIG. 11 illustrates a time-domain capture of uplink transmit power during a data connection between a mobile wireless device 102 and a CDMA2000 1×-EV-DO wireless network 100. The total transmit power varies based on both the amount of pilot transmit power as well as whether data transmission occurs. The bursty nature of the data transmission results in a time varying amount of transmit power used for data traffic. FIG. 11 illustrates that the total transmit power can be an unreliable indicator for an amount of transmit power headroom available for a data connection, as the amount of transmit power used for data communication varies substantially over time In order to determine which antenna to use for uplink transmission, the mobile wireless device 102 can estimate characteristics of an uplink transmission path between the mobile wireless device 102 and the radio access subsystem 106 in the wireless network 100. The uplink transmission path for each candidate transmit antenna can be estimated indirectly by observing radio frequency signal characteristics of signals received from the wireless network 100 in the downlink direction through each antenna individually. Radio frequency signal characteristics can include received signal strength, received signal code power and received signal to noise/interference ratios (SINR) that can provide an assessment of the downlink attenuation characteristics. The mobile wireless device 102 can infer that differences in attenuation in the downlink direction can imply similar attenuation for uplink transmissions. SINR imbalances between two different receive antennas in the mobile wireless device 102 can vary from a minimal difference of approximately 3 dB to a maximal difference of greater than 15 dB. When the difference in signal characteristics between antennas exceeds a pre-determined threshold, the mobile wireless device 102 can consider switching antennas for the uplink transmissions. A typical threshold for an SINR imbalance can be in the range of 6-10 dB. When there is an antenna signal characteristic imbalance and when simultaneously there is insufficient transmit headroom for uplink data transmission, the mobile wireless device 102 can select a different antenna for uplink transmission. Sufficiency in transmit headroom can depend on one or more different uplink transmission characteristics or states, e.g. a target data rate, a quality of service, and a guaranteed "grade of service". Sufficiency in transmit headroom can also depend on comparing an amount of buffered data to transmit compared to an amount of data allocation received from the wireless network 100 on which to transport the buffered data. Sufficiency can also be indirectly inferred by considering uplink transmit power levels and a history of uplink power commands received from the wireless network 100.

Figure 12:
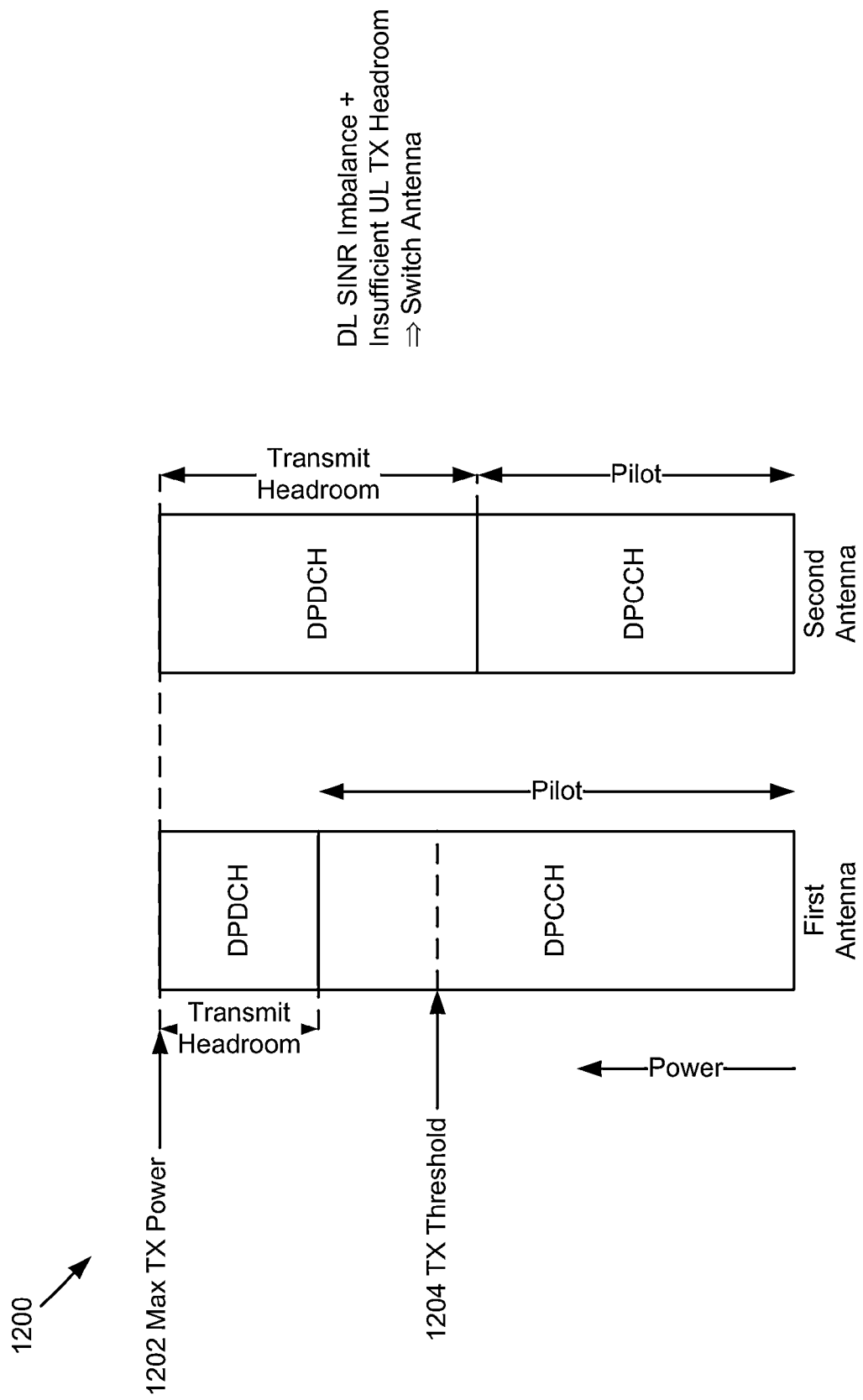
FIG. 12 illustrates a transmit power signal stack for two different antennas in a mobile wireless device.

FIG. 12 illustrates a transmit power stack 1200 for each of two antennas in a mobile wireless device 102. A maximum transmit power level 1202 can be set by a wireless communication protocol used by the mobile wireless device 102. An amount of transmit power allocated for the DPCCH (pilot signaling) channel can vary for each antenna, as attenuation and noise/interference characteristics for each path from each antenna to and from the wireless network 100 can vary. Consequently an amount of transmit headroom available for data transmission on the DPDCH (data/voice) channel can also vary between the two antennas. The mobile wireless device 102 can determine that there is insufficient uplink transmit power headroom when the DPCCH (power assigned to the pilot) exceeds a predetermined transmit power threshold 1204 for a transmit antenna being used (e.g. the first antenna as shown in FIG. 12). The mobile wireless device 102 can also measure downlink received signal characteristics, such as a downlink signal to noise/interference ratio (SINR), and when there a difference in the measured signaling characteristic between the two antennas exceeds a pre-determined signal characteristic threshold in addition to the insufficiency in uplink transmit power headroom, the mobile wireless device 102 can select to use the second antenna rather than the first antenna (i.e. switch antennas in use). The higher level of transmit power headroom for the second antenna can permit a higher uplink data throughput. After switching antennas, if the mobile wireless device 102 determines that the first antenna measures a higher downlink SINR than the second antenna, then the mobile wireless device 102 can select (i.e. switch back to using) the first antenna.

Figure 13:
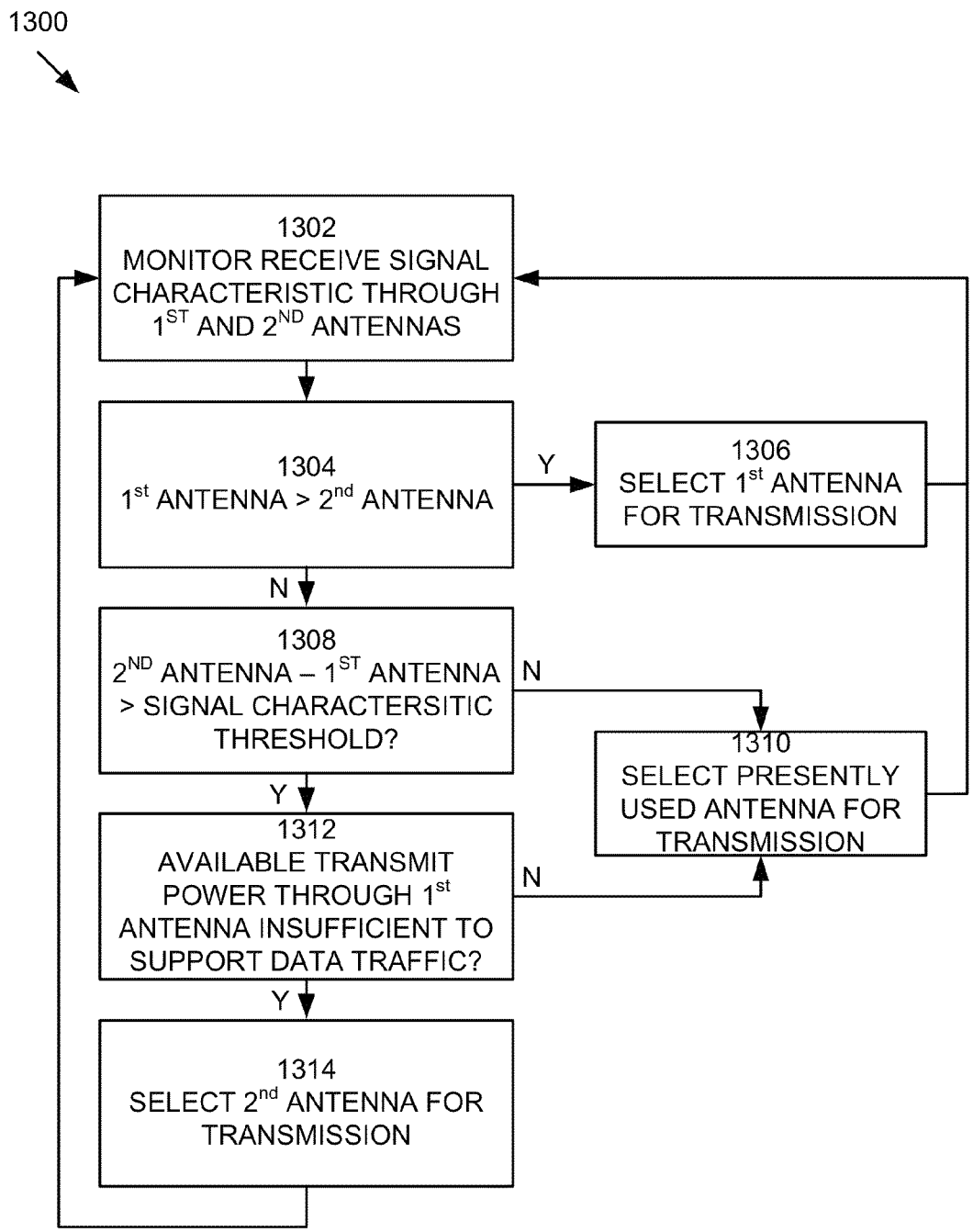
FIG. 13 illustrates a representative method to select an antenna adaptively based on measured receive and transmit signal characteristics at a mobile wireless device.

FIG. 13 outlines a representative method 1300 to select a transmit antenna in a mobile wireless device 102 connected to a wireless network 100. In step 1302, the mobile wireless device 102 can monitor a signal characteristic for signals received through a first antenna and through a second antenna. In a representative embodiment, the monitored signal characteristic can be a received signal to interference plus noise ratio (SINR). In step 1304, when the monitored signal characteristic for the first antenna exceeds the monitored signal characteristic for the second antenna, then in step 1306, the mobile wireless device 102 can select the first antenna for transmission. When the monitored signal characteristic for the first antenna does not exceed the monitored signal characteristic for the second antenna, then in step 1308, the mobile wireless device 102 can determine a difference in monitored signal characteristic between the first and second antennas. When the monitored signal characteristic for the second antenna exceeds the signal characteristic for the first antenna by at least a pre-determined signal characteristic threshold, the mobile wireless device 102 can continue in step 1312 to determine sufficiency for uplink data transmission. In step 1312, the mobile wireless device 102 can determine if an amount of transmit power available through the first antenna is insufficient to support data traffic. If transmit power headroom through the first antenna is sufficient to support data traffic, then in step 1310 the mobile wireless device 102 can select the presently used (first) antenna. When the transmit power headroom is insufficient to support data traffic as determined in step 1312, then in step 1314 the mobile wireless device 102 can select the second antenna for data transmission to the wireless network 100. When the monitored signal characteristic for the second antenna exceeds the monitored signal characteristic for the first antenna by no more than the signal characteristic threshold, then in step 1310, the mobile wireless device 102 can select the presently used (first of second) antenna for uplink transmission. The cycle of steps in the method 1300 shown in FIG. 13 can be repeated.

FIG. 13 illustrates a generic method to select a transmit antenna adaptively based on monitored signal characteristics and an estimate of the sufficiency of the uplink transmission path. A number of different more specific methods can select an antenna as follows. In a representative embodiment, the mobile wireless device 102 can determine that the transmit power headroom is insufficient to support data traffic in step 1312 when a transmit power level assigned to an uplink pilot signal exceeds a pre-determined threshold level. In an embodiment, the pre-determined threshold level for the pilot signal can be determined by an uplink data throughput rate that the mobile wireless device 102 would like to achieve. Lower threshold levels can provide more transmit headroom and therefore can ensure higher data throughput rates.

In another representative embodiment, the mobile wireless device 102 can determine that the available uplink transmit power through the currently used antenna is insufficient when a minimum uplink data rate for a grade of service guaranteed to the mobile wireless device 102 cannot be met using the current antenna. In yet a further embodiment, the mobile wireless device 102 can determine that the transmit power headroom is insufficient to support data traffic from the mobile wireless device 102 to the wireless network 100 when the mobile wireless device 102 is unable to transmit data through the current antenna at a specified quality of service level. The specified quality of service level can include one or more performance characteristics for the uplink transmission channel selected from a data rate, a packet or bit error rate and a transmission delay time.

In a representative embodiment, the mobile wireless device can further determine that available power to transmit through the first antenna is insufficient when both the uplink pilot signal exceeds a pre-determined pilot threshold level for a pre-determined time interval and the mobile wireless device receives repeated commands from the wireless network to increase the uplink pilot signal transmit power level during the pre-determined time interval. The pre-determined time interval can be selected to average the power measurements for the pilot signal as well as to monitor a number of power signaling commands received from the wireless network 100 by the mobile wireless device 102. Repeated "power up" commands received from the wireless network 100 can indicate that transmission in the uplink direction is "power limited" and additional transmit power is needed to achieve a level of service as determined by the wireless network 100. The wireless network 100 can conclude uplink transmissions from the mobile wireless device 102 have insufficient power when packet errors occur, when re-transmissions are required, when measuring a high level of interference or a weak received signal. The attenuation of signals from the mobile wireless device 102 to the wireless network 100 and the level of noise and interference at the receiver in the wireless network 100 can be limit an achievable quality of service.

In another embodiment, the mobile wireless device 102 can monitor an amount of data in an uplink transmit buffer in the mobile wireless device 102. The mobile wireless device 102 can calculate an amount of transmit power headroom required to transmit the amount of data in the uplink transmit buffer and can compare the calculated amount of transmit power required to an amount of available transmit power to use for uplink data transmission. In an embodiment, the amount of transmit power available can be based on an amount of network resources allocated for uplink data transmission by the wireless network 100 and indicated to the mobile wireless device 102. When using data applications, at times a user can be "idle" or sending a minimal amount of data, such as for a "text based" internet messaging (IM) application or for a small message system (SMS) application. With only small amounts of data to send for a data application, the mobile wireless device 102 can avoid switching transmit antennas by comparing an amount of buffered data to and amount of data resource allocations A media access control (MAC) layer processing element in the mobile wireless device 102 can calculate packet sizes for uplink transmission based on an amount of data in one or more uplink transmit buffers. The transmit buffers can mix high priority and low priority data from different logical channels having different priorities, and thus determining an antenna based on data can by independent of quality of service or grade of service for the particular packets. The wireless network 100 can also allocate a specific amount of transmission resources to the mobile wireless device 102 to use for uplink transmission. The mobile wireless device 102 can calculate a "traffic to pilot" (T2P) ratio, and when the T2P ratio exceeds a pre-determined threshold, the mobile wireless device 102 can select an antenna with the best measured SINR.

For any of the methods described above, the mobile wireless device 102 can continue to monitor receive signal characteristics through each of the antennas in the mobile wireless device 102. In some embodiments, a first antenna can be a "primary" antenna that can be used by default, while a second antenna can be a "secondary" antenna that can be used as an alternate. The mobile wireless device 102 can switch from the alternate "secondary" antenna back to the "primary" antenna whenever values for the monitored receive signal characteristic for the "primary" antenna exceeds monitored values of the receive signal characteristic for the "secondary" antenna. A "better" antenna can be preferred to ensure a minimum amount of transmit power is used to achieve a given data throughput rate and/or quality or grade of service. A lower transmit power level can result in lower power consumption from a battery in the mobile wireless device 102. As described above, switching from a "primary" antenna to a "secondary" antenna can occur when the monitored receive signal characteristic for the "secondary" antenna exceeds the monitored receive signal characteristic for the "primary" antenna by a pre-determined characteristic threshold level. Switching back from the "secondary" antenna to the "primary" antenna can occur whenever the "primary" antenna exceeds the "secondary" antenna. This asymmetry in decision for switching between antennas can provide a hysteresis effect so that the mobile wireless device 102 can avoid "bouncing" back and forth between antennas.

Various aspects of the described embodiments can be implemented by software, hardware or a combination of hardware and software. The described embodiments can also be encoded as computer program code on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method for selecting a transmit antenna for uplink transmissions in a mobile wireless device with multiple antennas, the method comprising:
   by the mobile wireless device:
   assessing downlink radio frequency signal characteristics for signals received via a first antenna and via a second antenna from a wireless network;
   estimating characteristics of uplink transmission paths to the wireless network for the first antenna and for the second antenna based on the assessment of downlink radio frequency signal characteristics;
   determining a difference between the downlink radio frequency signal characteristics of the second antenna and the first antenna; and
   switching between the first antenna and the second antenna for uplink transmission when a magnitude of the difference exceeds a signal characteristic threshold and simultaneously an amount of transmit power available through a presently used antenna is insufficient for uplink data transmission.

2. The method of claim 1 further comprising:
   when the magnitude of the difference does not exceed the signal characteristic threshold, selecting a presently used antenna for uplink transmission.

3. The method of claim 1 further comprising:
   selecting the first antenna for uplink transmission when the difference is less than zero and also when an amount of transmit power available through the first antenna is sufficient to support uplink data transmission.

4. The method of claim 1, wherein the amount of transmit power available comprises an amount of transmit power headroom, available for uplink data transmission, above an uplink pilot signal transmission power level.

5. The method of claim 3 further comprising:
   selecting the second antenna for uplink transmissions when an amount of available transmit power headroom through the first antenna is insufficient for uplink data transmission.

6. The method of claim 1, wherein the amount of available transmit power headroom is insufficient for uplink data transmission when an uplink pilot signal transmit power level exceeds a pilot power threshold level.

7. The method of claim 6 further comprising determining the pilot power threshold level based on an uplink data throughput rate achievable by the mobile device, wherein the pilot power threshold level is inversely related to the available transmit power headroom.

8. The method of claim 1, wherein the amount of available transmit power headroom is insufficient for uplink data transmission when a minimum uplink data rate for a grade of service cannot be met.

9. The method of claim 1, wherein the amount of available transmit power headroom is insufficient for uplink data transmission when the mobile wireless device is unable to transmit data through a presently used antenna at a specified quality level.

10. The method of claim 1, wherein the downlink radio frequency signal characteristics include one or more of: a received signal strength, a received signal code power (RSCP), and a received signal to noise plus interference ratio (SINR) for signals received via each antenna.

11. A mobile wireless device comprising:
    a plurality of antennas;
    a baseband processor configurable to process signals according to one or more wireless communication protocols and communicably coupled via a transceiver to the plurality of antennas; and
    the transceiver configurable to transmit radio frequency signals to and receive radio frequency signals from a wireless network via the plurality of antennas,
    wherein the baseband processor is further configurable to:
    measure a first signal received from the wireless network via a first antenna of the plurality of antennas and a second signal received from the wireless network via the second antenna of the plurality of antennas;
    select the first antenna for uplink transmission to the wireless network when a transmission characteristic for an uplink data connection is achievable using the first antenna based on measurements of the first and second signals;
    select the second antenna for uplink transmission to the wireless network when the transmission characteristic for the uplink data connection is not achievable using the first antenna and is achievable using the second antenna based on the measurements of the first and second signals; and
    otherwise, select a presently used antenna for uplink transmission to the wireless network,
    wherein the baseband processor determines which antenna to use for uplink transmission to the wireless network based at least in part on an amount of uplink transmit power headroom, available for uplink transmission, above an uplink pilot signal transmission power level.

12. The mobile wireless device of claim 11, wherein the transmission characteristic for the uplink data connection comprises a minimum uplink data throughput rate required for uplink data transmission.

13. The mobile wireless device of claim 12, wherein the minimum uplink data throughput rate required for uplink data transmission is based on a guaranteed grade of service or a required quality of service for uplink data transmission.

14. The mobile wireless device of claim 11, wherein the measurements of the first and second signals comprise one or more of: a received signal strength, a received signal code power (RSCP), and a received signal to noise plus interference ratio (SINR) for signals received via each antenna.

15. The mobile wireless device of claim 14, wherein the baseband processor is further configured to switch antennas for uplink transmission when the SINR for signals received via the first and second antennas differ by more than an SINR imbalance threshold.

16. A non-transitory computer-readable medium having computer program code stored thereon for selecting a transmit antenna for uplink transmission in a mobile wireless device connected to a wireless network, the computer program code, when executed by one or more processors in the mobile wireless device, causes the mobile wireless device to perform a method comprising:
assessing downlink radio frequency signal characteristics for signals received via a first antenna and via a second antenna from a wireless network;
estimating characteristics of uplink transmission paths to the wireless network for the first antenna and for the second antenna based on the assessment of downlink radio frequency signal characteristics;
determining a difference between the downlink radio frequency signal characteristics of the second antenna and the first antenna; and
switching between the first antenna and the second antenna for uplink transmission when a magnitude of the difference exceeds a signal characteristic threshold and simultaneously an amount of transmit power available through a presently used antenna is insufficient for uplink data transmission.

17. The non-transitory computer-readable medium of claim 16, wherein the method further comprises:
when the magnitude of the difference does not exceed the signal characteristic threshold, selecting a presently used antenna for uplink transmissions.

18. The non-transitory computer-readable medium of claim 17, wherein the method further comprises:
selecting the first antenna for uplink transmission when the difference is less than zero and also when an amount of transmit power available through the first antenna is sufficient to support uplink data transmission.

19. The non-transitory computer-readable medium of claim 16, wherein the amount of transmit power available comprises an amount of transmit power headroom, available for uplink data transmission, above an uplink pilot signal transmission power level.

* * * * *